US006611125B2

(12) United States Patent
Nagata et al.

(10) Patent No.: US 6,611,125 B2
(45) Date of Patent: Aug. 26, 2003

(54) METHOD FOR CALCULATING INERTIA MOMENT AND DRIVER FOR ELECTRIC MOTOR

(75) Inventors: Koichiro Nagata, Mito (JP); Toshiaki Okuyama, Tokai (JP); Hiroshi Fujii, Chiba (JP); Shigetoshi Okamatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 09/791,680

(22) Filed: Feb. 26, 2001

(65) Prior Publication Data

US 2002/0097018 A1 Jul. 25, 2002

(30) Foreign Application Priority Data

Nov. 14, 2000 (JP) ......................................... 2000-346718

(51) Int. Cl.[7] .............................. H02P 5/28; H02P 7/00; H02P 5/34
(52) U.S. Cl. ....................... 318/727; 318/456; 318/457; 318/461; 318/434; 318/800; 318/801
(58) Field of Search ................................ 318/456, 457, 318/461, 430, 431, 434, 444, 274, 276, 383, 635, 648, 651, 727, 778, 779, 782, 798, 800, 801, 803, 805–812, 3, 799, 802; 388/902, 903, 906, 930

(56) References Cited

U.S. PATENT DOCUMENTS 3,603,856 A * 9/1971 Zalar et al. .................. 318/434
5,175,483 A * 12/1992 Fujii et al. ................... 318/799
5,703,459 A * 12/1997 Yasohara et al. ............ 318/758
5,994,867 A * 11/1999 Birk et al. ................... 318/609
6,014,007 A * 1/2000 Seibel et al. ................ 318/798
6,037,736 A * 3/2000 Tsuruta et al. .............. 318/609
6,229,722 B1 * 5/2001 Ichikawa et al. ............. 363/71

FOREIGN PATENT DOCUMENTS

JP         10314484 A  * 12/1998 .......... D06F/25/00
JP       2001169584 A  *  6/2001 .......... H02P/5/17

OTHER PUBLICATIONS

Johnson, A.A., "Application of Capacitors to Power Systems", Electrical Transmission and Distribution Reference Book, 1964, Westinghouse Electric Corporation, 4th Edition, Chapter 8, pp. 234–235.*

* cited by examiner

Primary Examiner—Robert E. Nappi
Assistant Examiner—Patrick Miller
(74) Attorney, Agent, or Firm—Antonelli, Terry, Stout & Kraus, LLP

(57) ABSTRACT

An electric motor is rotated at a velocity $\omega_1$. After that, during $\Delta t_{12}$ seconds, the 1st acceleration is executed at a rate $(\omega_2-\omega_1)/\Delta t_{12}$. During this acceleration, the torque $\tau_m$ is calculated so as to execute the time integration. After the lapse of $\Delta t_{12}$, the integrated result is stored. Next, the velocity is set to be $\omega_3$. After that, during $\Delta t_{34}$ seconds, the 2nd acceleration is executed at a rate $(\omega_4-\omega_3)/\Delta t_{34}$. At the 2nd acceleration, although the integration-starting and the integration-terminating velocities are each equal to those at the 1st acceleration, the acceleration rate is modified ($\omega_3=\omega_1$, $\omega_4=\omega_2$, $\Delta t_{12}\neq\Delta t_{34}$). During this acceleration, the torque $\tau_m$ is calculated so as to execute the time integration, after the lapse of $\Delta t_{34}$, storing the integrated result. The inertia J is calculated using the 1st and 2nd integrated results.

14 Claims, 4 Drawing Sheets

1ST ACCELERATION: FROM $\omega 1$ TO $\omega 2$, ACCELERATION IS EXECUTED AT $(\omega 2-\omega 1)/(T_0/n_1)$ 2ND ACCELERATION: FROM $\omega 3$ TO $\omega 4$, ACCELERATION IS EXECUTED AT $(\omega 4-\omega 3)/(T_0/n_2)$

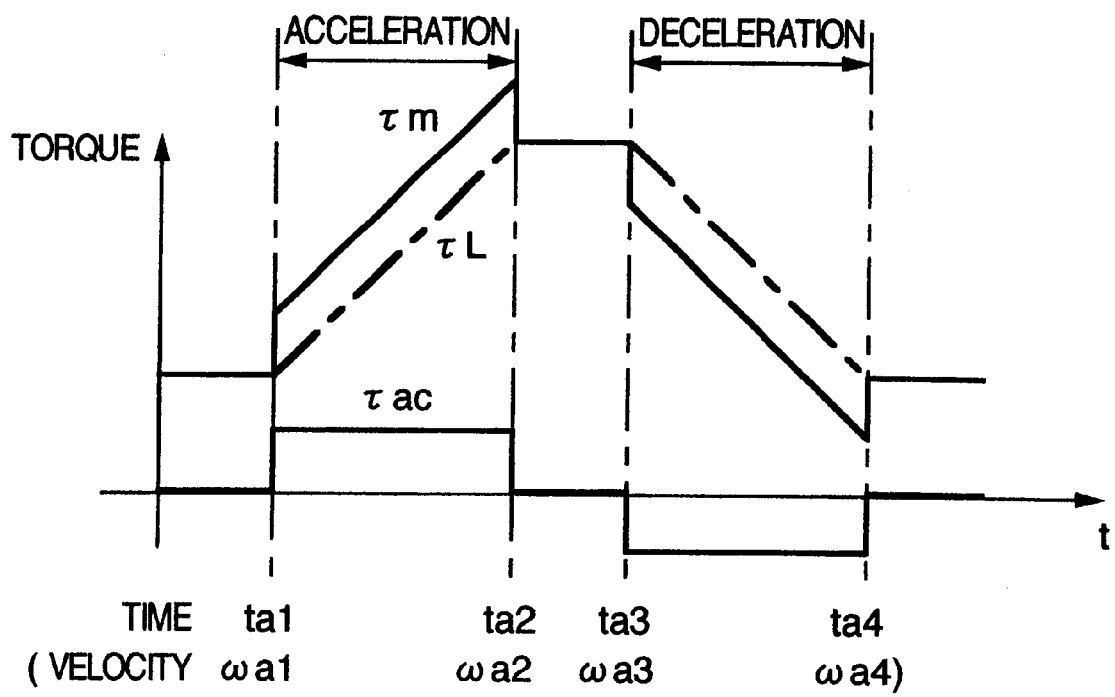
FIG.4 - PRIOR ART

METHOD FOR CALCULATING INERTIA MOMENT AND DRIVER FOR ELECTRIC MOTOR

BACKGROUND OF THE INVENTION

1. Field of the Invention

The present invention relates to an inertia calculating method and an electric motor driver. More particularly, it relates to the inertia moment (inertia) calculating method and the electric motor driver at the time of executing the velocity control of an inductive electric motor.

2. Description of the Related Art

When executing the velocity control of an electric motor, the mechanical inertia becomes necessary as a control constant. As a prior art for measuring the inertia, JP-A-61-88780 has disclosed the following method: The acceleration and the deceleration are executed at the velocity-changing rates the absolute values of which are the same in the same velocity differences (their velocity width $\Delta\omega_r$). Then, the acceleration torque $\tau_{ac}$ and the deceleration torque $\tau_d$ are calculated from the respective torque proportion signals so as to calculate the inertia J from the integrated quantities of the respective torques during the acceleration and the deceleration. Hereinafter, the method will be explained in detail:

FIG. 4 is a diagram for illustrating the motor torque $\tau_m$, the load torque $\tau_L$, and the acceleration torque $\tau_{ac}$ in the case of performing the calculation of the inertia J in accordance with the prior art. In FIG. 4, letting the motor machine's angular velocity be abbreviated as $\omega$, the relation holding between J and the torques is given by the equation (1):

$$J\frac{d\omega}{dt} = \tau_m - \tau_L = \tau_{ac} \quad (1)$$

The velocity difference $\Delta\omega$ caused by the acceleration at the acceleration time-period is equal to the velocity difference $\Delta\omega$ caused by the deceleration at the deceleration time-period. Integrating both sides of the equation (1) to determine J from the torques at the acceleration and the deceleration time-periods, J is given by the equation (2):

$$J = \frac{\int_{ta2}^{ta1}(\tau_m - \tau_L)dt}{\Delta\omega} = \frac{\int_{ta3}^{ta4}(\tau_m - \tau_L)dt}{-\Delta\omega} \quad (2)$$

Determining once again J by averaging the above-described J values calculated at the acceleration and the deceleration time-periods, J is represented by the equation (3):

$$J = \frac{1}{2}\left\{\frac{\int_{ta2}^{ta1}(\tau_m - \tau_L)dt}{\Delta\omega} + \frac{\int_{ta3}^{ta4}(\tau_m - \tau_L)dt}{-\Delta\omega}\right\} \quad (3)$$

Here, since the acceleration and the deceleration are executed in the same velocity differences during the same time-periods, the integrated values of the load torque $\tau_L$ during the acceleration and the deceleration time-periods become equal to each other:

$$\int_{ta2}^{ta1}\tau_L dt = \int_{ta3}^{ta4}\tau_L dt \quad (4)$$

Accordingly, from the equations (3) and (4), J is determined from $\tau_m$ alone as is expressed by the equation (5):

$$J = \frac{\int_{ta2}^{ta1}\tau_m dt - \int_{ta3}^{ta4}\tau_m dt}{2\Delta\omega} \quad (5)$$

Using a detected torque current $I_{qFB}$, the value of $\tau_m$ can be calculated as is expressed by, e.g., the equation (6):

$$\tau_m = 3\left(\frac{P}{2}\right)\frac{M}{L_2} \cdot MI_d^* \cdot I_{qFB} \equiv \Delta_0 \cdot I_{qFB} \quad (6)$$

where, P, M, $L_2$, and $I_d^*$ denotes the following, respectively: The motor pole number, the motor mutual inductance, summation of the motor mutual inductance and the motor secondary-side leakage inductance, and the magnetic field excitation current instruction. Based on the above-described explanation, J is calculated from the equations (5) and (6).

In this method, the cancellation of the load torques $\tau_L$ makes it possible to calculate the inertia J independently of the form of the load torque.

In the method disclosed in JP-A-61-88780, however, as will be pointed out below, the motor is in a danger of being transitioned into a regenerative state at the deceleration time-period. This regenerative state overcharges, e.g., a smoothing capacitor within an inverter, thereby damaging the capacitor.

In FIG. 4, the motor torque $\tau_m$ becomes the lowest at the deceleration-terminating time ($t=t_{a4}$). At this time, the torque current $I_q$ also becomes its minimum. Assuming that the load torque $\tau_L$ is proportional to the square of the angular velocity $\omega$ (i.e., square load), $I_q$ is determined from the equations (1) and (6) as is expressed by the equation (7): Incidentally, the reference notations therein denote the following, respectively: $\omega$ the motor velocity, $\omega_0$ the rated motor velocity, $d\omega/dt$ the velocity-changing rates (the acceleration and the deceleration rates), P, the motor pole number, M, the motor mutual inductance, $L_2$ the summation of the motor secondary-side leakage inductance and M, $I_d^*$ the magnetic field excitation current instruction, J the mechanical inertia, and, $I_{q0}$ the rated motor torque current.

$$I_q = \left(\frac{\omega}{\omega_0}\right)^2 \cdot I_{q0} + \frac{1}{3\left(\frac{P}{2}\right)\frac{M}{L_2} \cdot MI_d^*} \frac{d\omega}{dt}J \quad (7)$$

$$= \left(\frac{\omega}{\omega_0}\right)^2 \cdot I_{q0} + \frac{1}{\Delta_0}\frac{d\omega}{dt}J \quad \left(\Delta_0 = 3\left(\frac{P}{2}\right)\frac{M}{L_2} \cdot MI_d^*\right)$$

As a result, there exist some cases where the minimum value of $I_q$ (i.e., the equation (7)) becomes negative and thus the motor is transitioned into the regenerative state, because the deceleration rate $d\omega/dt$ is negative at the deceleration time-period. As seen from the equation (7), the condition under which the minimum value of $I_q$ becomes negative and the motor is transitioned into the regenerative state is the case where the deceleration is executed in a region of small $\omega$ (the load torque) and $|d\omega/dt|$, i.e., the deceleration rate at that time, is large. consequently, in order to prevent the regenerative state from occurring at the deceleration time-period, it becomes absolutely required to reduce the deceleration rate (=the acceleration rate). In that occasion, however, the acceleration or the deceleration torque does not become larger enough as compared with the motor torque and the load torque components that become an error. This gives rise to an expectation that the inertia-identifying accuracy will become worse.

SUMMARY OF THE INVENTION

It is an object of the present invention to provide an inertia calculating method and an electric motor driver that are preferable for calculating the inertia and for driving an electric motor without causing the regeneration to occur and based on a configuration that is simpler as compared with the configuration in the prior art.

In order to accomplish the above-described object, in a driver including a non-regenerative type power converter and executing the velocity control of the electric motor with the use of a mechanical inertia constant, the non-regenerative type power converter being a converting apparatus for converting an alternating current from an alternating power supply into an alternating current of a variable voltage and a variable frequency, the non-regenerative type power converter including a forward converter for converting the alternating current from the alternating power supply into a direct current, a smoothing capacitor connected to a direct current circuit, and a backward converter for converting the direct current into the alternating current, when calculating the mechanical inertia, the mechanical inertia is calculated during only the motor acceleration time-period so that a voltage of the smoothing capacitor included in the non-regenerative type power converter will not exceed a predetermined value.

Also, when calculating the mechanical inertia, the accelerations are executed at a plurality of times at the mutually different velocity-changing rates, and the mechanical inertia is calculated from the integrated quantities of the respective torque proportion signals and the velocity-changing widths.

Also, in a driver including a power converter and executing the velocity control of the electric motor with the use of a mechanical inertia constant, the power converter including a forward converter for converting an alternating current from an alternating power supply into a direct current, a smoothing capacitor connected to a direct current circuit, and a backward converter for converting the direct current into an alternating current, the power converter converting the alternating current from the alternating power supply into the alternating current of a variable voltage and a variable frequency, when calculating the mechanical inertia from the integrated quantities of the torque proportion signals and the velocity-changing widths at the time of changing the rotation velocity of the electric motor, the accelerations are executed at a plurality of times at the mutually different velocity-changing rates, and the mechanical inertia is calculated from the integrated quantities of the respective torque proportion signals and the velocity-changing widths.

According to the present invention, in comparison with the prior art method, the mechanical inertia is calculated during only the motor acceleration time-period. This condition allows the identification of the inertia J to be executed without causing the regeneration to occur.

Also, according to the present invention, the accelerations are executed at the plurality of times at the mutually different velocity-changing rates, thereby calculating the mechanical inertia J. This condition makes unnecessary the data at the deceleration time-period, which has been required in the prior art method. As a result, it becomes possible to apply the present invention to a regeneration operation-incapable inverter as well. Also, in particular, it becomes possible to simplify the configuration of an electric motor driver including the regeneration operation-incapable inverter.

BRIEF DESCRIPTION OF THE DRAWINGS

FIG. 4 is the diagram for illustrating the motor torque, the load torque, and the acceleration torque in the case of performing the calculation of the inertia J in the prior art.

DESCRIPTION OF THE EMBODIMENTS

Hereinafter, using the drawings, the explanation will be given below concerning the embodiments of the present invention.

Figure 1:
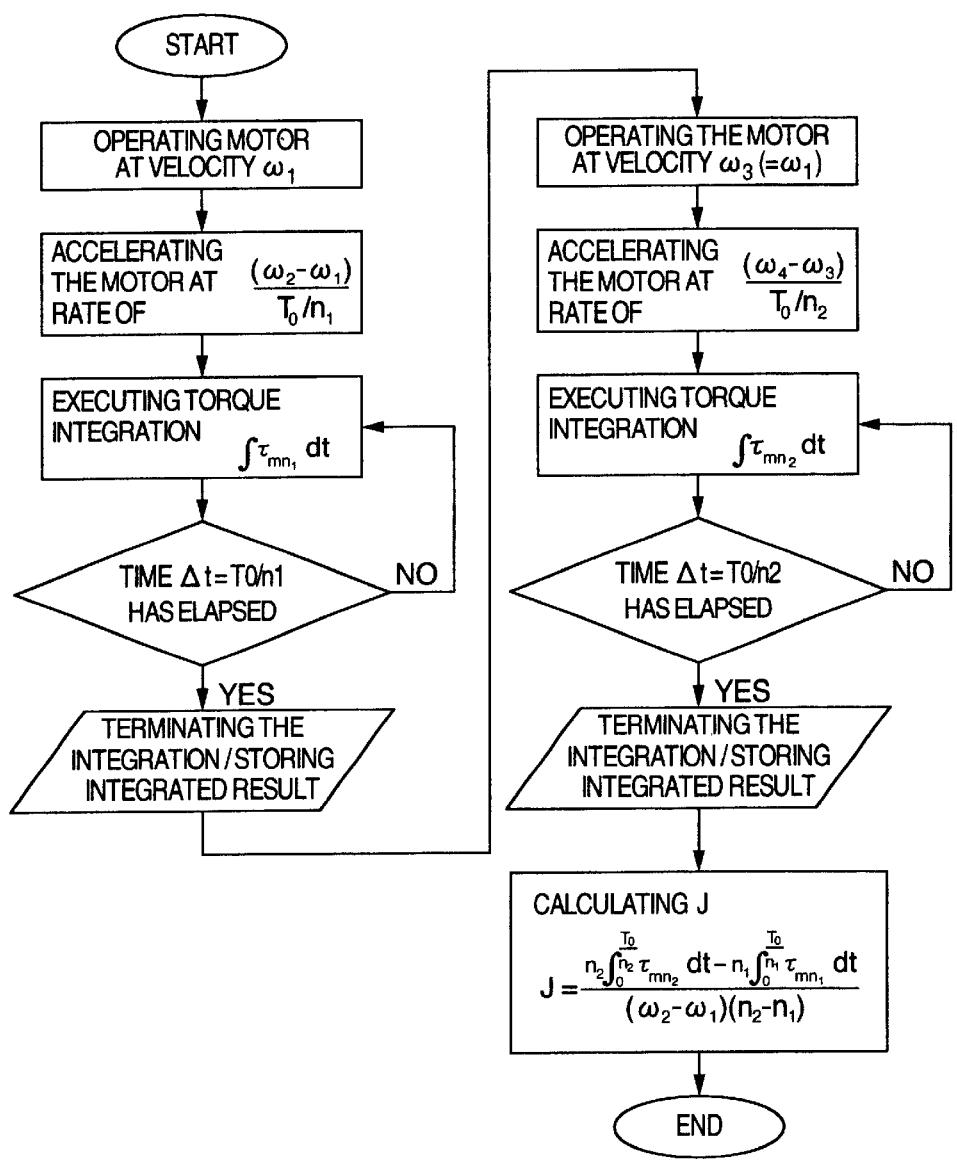
FIG. 1 is a flow chart for illustrating an inertia calculating method according to a 1st embodiment of the present invention.
Figure 2:
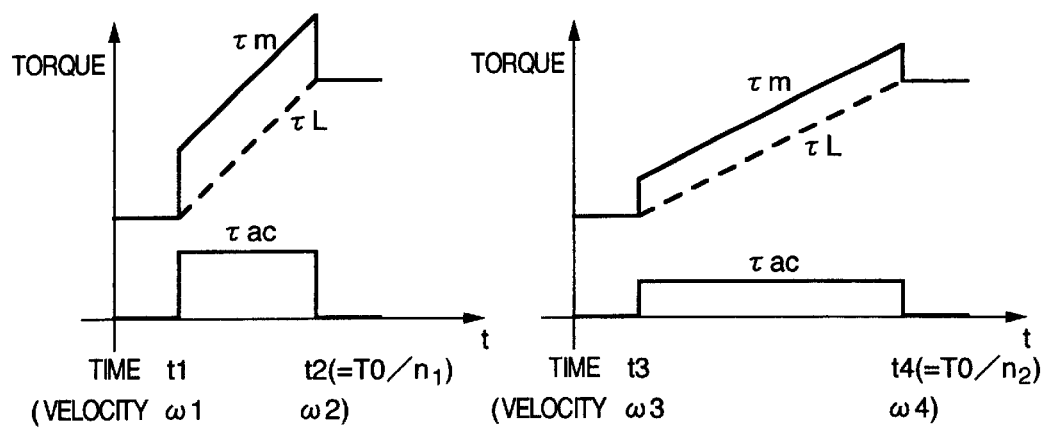
FIG. 2 is a diagram for illustrating the motor torque, the load torque, and the acceleration torque in the case of performing the calculation of the inertia J in the present invention.

FIG. 1 is the flow chart for illustrating the inertia calculating method according to the 1st embodiment of the present invention. FIG. 2 illustrates the motor torque $\tau_m$, the load torque $\tau_L$, and the acceleration torque $\tau_{ac}$ in the case of performing the calculation of the inertia J in the present embodiment.

In the present embodiment, the accelerations in the same velocity differences $\Delta\omega$ are executed at 2 times at 2 types of different acceleration rates thereof, then identifying J from the integrated quantities of the respective motor torques $\tau_m$.

The method will be described in detail below: At first, the motor is rotated at a predetermined angular velocity $\omega_1$. After that, during $\Delta t_{12}$ (=$T_0/n_1$, where $T_0$, $n_1$ are arbitrary) seconds ranging from a time $t_1$ to $t_2$ (from the velocity $\omega_1$ to $\omega_2$), the 1st acceleration is executed at an acceleration rate $(\omega_2-\omega_1)/\Delta t_{12}$. During this acceleration, the motor torque $\tau_m$ is calculated from the equation (6) so as to execute the time integration. After the lapse of $\Delta t_{12}$, the integrated result is stored. Next, the motor angular velocity is set to be $\omega_3$. In the present embodiment, it is assumed that $\omega_3=\omega_1$ (i.e., the velocity is brought back to the velocity at the time of the 1st acceleration). After that, during $\Delta t_{34}$ (=$T_0/n_2$, where $T_0$, $n_2$ are arbitrary) seconds ranging from a time $t_3$ to $t_4$ (from the velocity $\omega_3$ to $\omega_4$), the 2nd acceleration is executed at an acceleration rate $(\omega_4-\omega_3)/\Delta t_{34}$. At the 2nd acceleration, although the integration-starting velocity and the integration-terminating velocity are equal to those at the 1st acceleration, respectively, the acceleration rate is modified (i.e., $\omega_3=\omega_1$, $\omega_4=\omega_2$, $\Delta t_{12}\neq\Delta t_{34}$). During the acceleration, the motor torque $\tau_m$ is calculated from the equation (6) so as to execute the time integration, then, after the lapse of $\Delta t_{34}$, storing the integrated result. Finally, the inertia J is calculated using the 1st and the 2nd integrated results.

The method will be explained in more detail below: The motor torque $\tau_m$ can be represented from the equation (1) as is expressed by the equation (8):

$$\tau_m = \tau_L + J \cdot \frac{d\omega}{dt} = \tau_L + J \cdot \frac{\Delta\omega}{T_0/n} \quad (8)$$

At this time, letting $t_1=0$, the both sides are integrated.

$$\int_0^{\frac{T_0}{n}} \tau_m \, dt = \int_0^{\frac{T_0}{n}} \tau_L \, dt + \int_0^{\frac{T_0}{n}} \tau_{ac} \, dt \quad (9)$$

Here, considering that the 1st and the 2nd accelerations are executed in the same velocity differences (i.e., $\omega_1 \to \omega_2$) and assuming that $\tau_L$ can be represented by a $\omega$'s function $f(\omega)$ alone, as will be proved below, the term for $\tau_L$ in the equation (9) becomes a constant that depends on n (the acceleration rates) alone. Incidentally, $I_q^*$ denotes a torque current instruction, and $f(\omega)=0\sim1$ (1; the rated velocity time).

$$\tau_L = 3\left(\frac{P}{2}\right)\frac{M}{L_2} \cdot M I_d^* \cdot I_q^* \cdot f(\omega) = B_0 \cdot f(\omega) \quad (10)$$

$$\int_0^{\frac{T_0}{n}} \tau_L = B_0 \times \int_0^{\frac{T_0}{n}} f(\omega) dt$$

$$= B_0 \times \frac{1}{d\omega/dt}\int_{\omega_1}^{\omega_2} f(\omega) d\omega$$

$$= \frac{1}{n}\frac{T_0}{\Delta\omega}B_0 \times \int_{\omega_1}^{\omega_2} f(\omega) d\omega = \frac{1}{n}C_0 \quad (11)$$

Also, if the velocity-changing amounts (i.e., $\Delta\omega$) are constant, the term for $\tau_{ac}$ in the equation (9) can also be represented by a constant $\times J$.

$$\int_0^{\frac{T_0}{n}} \tau_{ac} \, dt = \int_0^{\frac{T_0}{n}} n\frac{J}{T_0}\Delta\omega \, dt$$

$$= n\frac{J}{T_0}\Delta\omega \cdot \frac{T_0}{n} = \Delta\omega \cdot J \quad (12)$$

Consequently, when, for the 2 types of acceleration rates (i.e., $n=n_1, n_2$), the corresponding velocities before and after the accelerations (i.e., $\omega_1, \omega_2$) are equal to each other, the following equations (13) are derived from the equations (9), (11), and (12):

$$\int_0^{\frac{T_0}{n_1}} \tau_{mn1} \, dt = \Delta\omega \cdot J + \frac{1}{n_1} \cdot C_0 \quad (13)$$

$$\int_0^{\frac{T_0}{n_2}} \tau_{mn2} \, dt = \Delta\omega \cdot J + \frac{1}{n_2} \cdot C_0$$

Solving the equations (13) with respect to $C_0$, $C_0$ is found as follows:

$$C_0 = \frac{\int_0^{\frac{T_0}{n_1}} \tau_{mn1} \, dt - \int_0^{\frac{T_0}{n_2}} \tau_{mn2} \, dt}{\left(\frac{1}{n_1} - \frac{1}{n_2}\right)} \quad (14)$$

Determining J from the equations (13) and (14), J is determined as follows:

$$J = \frac{\int_0^{\frac{T_0}{n_1}} \tau_{mn1} \, dt - \frac{1}{n_1} \cdot C_0}{\Delta\omega} \quad (15)$$

$$= \frac{\int_0^{\frac{T_0}{n_1}} \tau_{mn1} \, dt - \frac{1}{n_1} \cdot n_1 \cdot n_2 \frac{\int_0^{\frac{T_0}{n_1}} \tau_{mn1} \, dt - \int_0^{\frac{T_0}{n_2}} \tau_{mn2} \, dt}{n_2 - n_1}}{\Delta\omega}$$

$$= \frac{n_2 \int_0^{\frac{T_0}{n_2}} \tau_{mn2} \, dt - n_1 \int_0^{\frac{T_0}{n_1}} \tau_{mn1} \, dt}{\Delta\omega(n_2 - n_1)}$$

Based on the above-described explanation, J is calculated from the equations (6) and (15).

Figure 3:
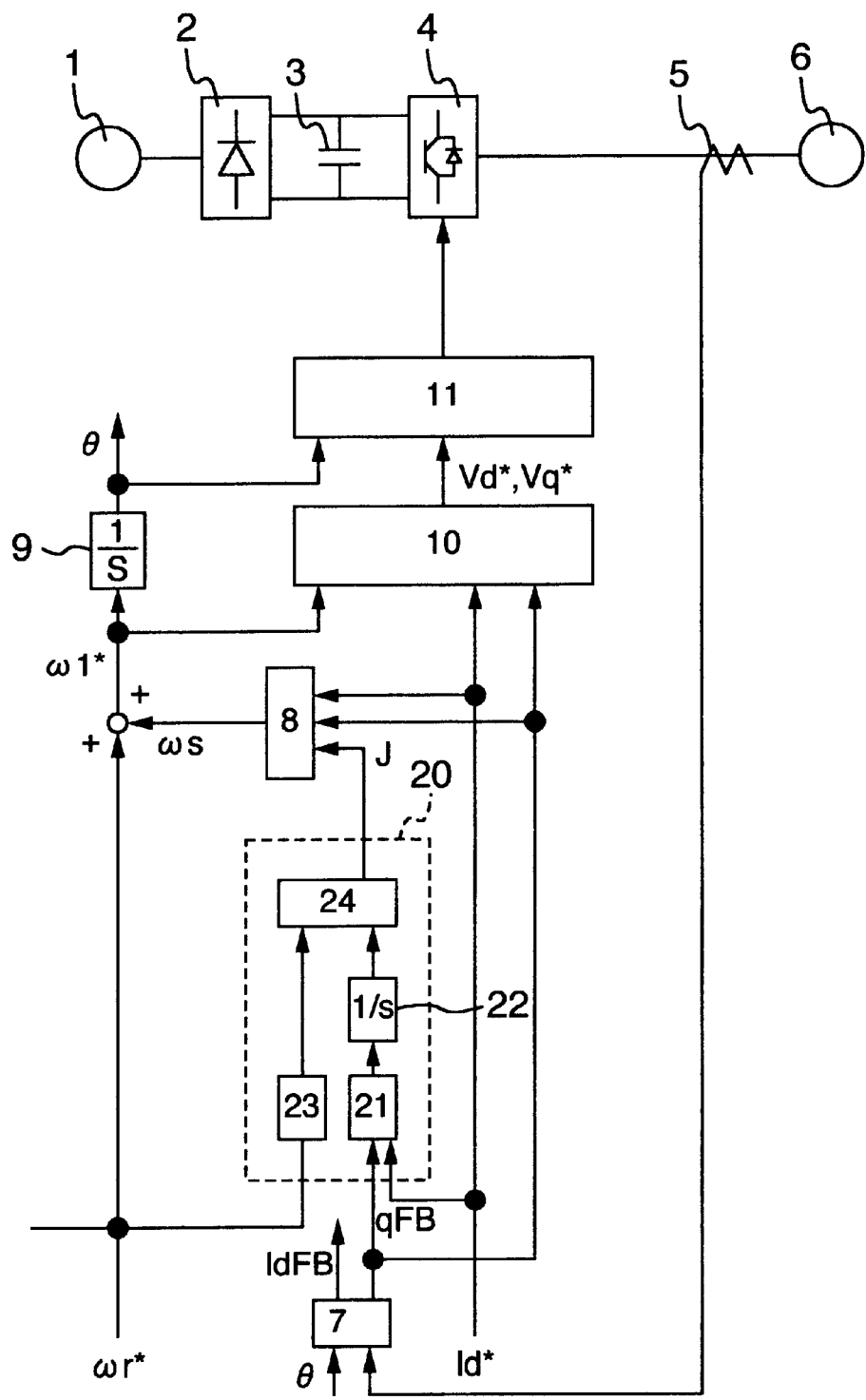
FIG. 3 is a block diagram for illustrating an electric motor driver according to a 2nd embodiment of the present invention.

FIG. 3 illustrates the block diagram of the electric motor driver according to the 2nd embodiment of the present invention. In FIG. 3, a 3-phase alternating voltage from a power supply 1 is converted into a direct current by a converter 2, and a smoothing capacitor 3 for smoothing the direct current is provided, and the smoothed direct current is converted by an inverter 4 into a 3-phase alternating voltage of an arbitrary frequency, then being inputted into an inductive electric motor 6. Here, the converter 2, the smoothing capacitor 3, and the inverter 4 constitute the non-regenerative type power converter. A voltage instruction value calculating unit 10, using the current detected by a current detecting unit 5, calculates 2-phase voltage instructions Vd*, Vq* in accordance with, e.g., a velocity sensor-less vector controlling method. After that, using a phase $\theta$ that a phase calculating unit 9 obtains by integrating a frequency instruction value $\omega_1^*$, a 3-phase alternating voltage instruction value is calculated by a 2-phase/3-phase converting unit 11 so as to be inputted into the inverter unit 4.

Also, a detected current coordinate converting unit 7, using the phase $\theta$, converts the current detected by the current detecting unit 5 into a detected magnetic field excitation current $I_{dFB}$ and the detected torque current $I_{qFB}$.

Next, the explanation will be given below concerning a J identifying unit 20. While a velocity instruction value $\omega_r^*$ is being increased so as to accelerate the motor, the motor torque $\tau_m$, after being calculated in accordance with the equation (6) by a torque calculating unit 21, is integrated by a torque integrating unit 22. These calculations are executed during the 2-time accelerations, respectively. After the 2-time accelerations have been performed, a J calculating unit 24 calculates the inertia J in accordance with the equation (15) and using the velocity-changing widths $\Delta\omega$ calculated by a $\Delta\omega$ calculating unit 23.

It is set that these calculations are executed, e.g., off-line. After J has been calculated once, the value is fixed. During the subsequent operations, using this J value, a slip velocity calculating unit 8 calculates a slip correction value $\omega_s$. Finally, the velocity control of the electric motor is executed, using the frequency instruction value $\omega_1^*$ obtained by adding the slip correction value $\omega_s$ to the velocity instruction value $\omega_r^*$.

Next, as a 3rd embodiment of the present invention, when designating, as $I_{q(limit)}$, the upper limit value of the torque current that is permitted to pass through without causing a hindrance to the motor's operation, the acceleration rate $d\omega/dt$ (refer to the equation (7)) is set to be as expressed by the equation (16):

When $I_q$ passes through in accordance with the equation (7), the present embodiment results in an effect that $I_q$ will never exceed $I_{q(limit)}$ (i.e., $I_q$ will never become an overcurrent).

$$\frac{d\omega}{dt} \leq 3\left(\frac{P}{2}\right)\left(\frac{M}{L_2}\right)\frac{M \cdot J_d^*}{J}\left(I_{q(limit)} - \left(\frac{\omega}{\omega_0}\right)^2 I_{q0}\right) \quad (16)$$

Also, as a 4th embodiment of the present invention, the terminating velocity $\omega_f$ at which the acceleration and the integration are terminated (refer to $\omega$ in the equation (7)) is set to be as expressed by the equation (17):

When $I_q$ passes through in accordance with the equation (7), the present embodiment results in an effect that $I_q$ will never exceed $I_{q(limit)}$ (i.e., $I_q$ will never become an overcurrent).

$$\omega_f \leq \sqrt{\frac{I_{q(limit)} - \frac{d\omega}{dt}J \big/ \left\{3\left(\frac{P}{2}\right)\left(\frac{M}{L_2}\right)M \cdot I_d^*\right\}}{I_{q0}}} \cdot \omega_0 \quad (17)$$

Also, as a 5th embodiment of the present invention, the accelerations are executed at 2 or more times. Then, the J values are determined from the results at the 2 times each, finally taking the average thereof. This results in an effect of enhancing the J-identifying accuracy even further.

As having been explained so far, although, as the embodiments of the present invention, the explanation has been given concerning the cases where the present invention is applied to the non-regenerative type power converter, the present invention is applicable to the regenerative type power converter as well.

Also, the non-regenerative type power converter, which has an incoming voltage of 3 kV or more and a capacitance of 100 kVA or more, is a high-voltage multiple-inverter including a plurality of unit-cell inverters. Consequently, the present invention is particularly effective when applied to such a high-voltage multiple-inverter.

Following items are further disclosed in connection with the above explanation.

[1] An inertia calculating method in a driver including a non-regenerative type power converter and executing velocity control of an electric motor with the use of a mechanical inertia constant, said driver being a converting apparatus for converting an alternating current from an alternating power supply into an alternating current of a variable voltage and a variable frequency, said non-regenerative type power converter including a forward converter for converting said alternating current from said alternating power supply into a direct current, a smoothing capacitor connected to a direct current circuit, and a backward converter for converting said direct current into said alternating current, said inertia calculating method, comprising the step of: when calculating said mechanical inertia, calculating said mechanical inertia during only a motor acceleration time-period so that a voltage of said smoothing capacitor will not exceed a predetermined value.

[2] An inertia calculating method in a driver including a non-regenerative type power converter and executing velocity control of an electric motor with the use of a mechanical inertia constant, said driver being a converting apparatus for converting an alternating current from an alternating power supply into an alternating current of a variable voltage and a variable frequency, said non-regenerative type power converter including a forward converter for converting said alternating current from said alternating power supply into a direct current, a smoothing capacitor connected to a direct current circuit, and a backward converter for converting said direct current into said alternating current, said inertia calculating method, comprising the steps of: when calculating said mechanical inertia, executing accelerations at a plurality of times at mutually different velocity-changing rates, and calculating said mechanical inertia from integrated quantities of respective torque proportion signals and velocity-changing widths.

[3] The inertia calculating method according to [2], wherein, when executing said accelerations, said velocity-changing rates are set so that said motor current will not become larger than a predetermined value.

[4] The inertia calculating method according to [2], wherein, when executing said accelerations, $d\omega/dt$ are set to be smaller than $$3 \times (P/2) \times (M/L_2) \times (M \times I_d^*/J) \times (I_{q(limit)} - (\omega/\omega_0)^2 \times I_{q0}),$$

where each reference notation denotes the following: $d\omega/dt$ said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $\omega$ motor velocity, $\omega_0$ rated motor velocity, and, $I_{q0}$ rated motor torque current.

[5] The inertia calculating method according to [2], wherein, when executing said accelerations, a motor velocity at the time when said integrations are terminated is set so that said motor current will not become larger than a predetermined value.

[6] The inertia calculating method according to [2], wherein, when executing said accelerations, $\omega_f$ is set to be smaller than $$\omega_0 \times \sqrt{[(I_{q(limit)} - d\omega/dt \times J/(3 \times (P/2) \times (M/L_2) \times M \times I_d^*))/I_{q0}]},$$

where each reference notation denotes the following: $d\omega/dt$ said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $\omega_f$ a motor velocity at the time when said integrations are terminated, $\omega_0$ rated motor velocity, and, $I_{q0}$ rated motor torque current.

[7] The inertia calculating method according to any one of [1] to [6], comprising the steps of:

when executing said accelerations, executing one acceleration, and thereafter, bringing said velocity back to said velocity before said one acceleration, and thereafter, modifying said velocity-changing rate so as to execute a next acceleration.

[8] The inertia calculating method according to any one of [1] to [6], wherein, when executing said accelerations, $\omega_1$ is equal to $\omega_3$ and $\omega_2$ is equal to $\omega_4$, where each reference notation denotes the following: $\omega_1$ a velocity at which said integration of said torque proportion signal is started at one acceleration, $\omega_2$ a velocity at which said integration is terminated, $\omega_3$ a velocity at which said integration of said torque proportion signal is started at a next acceleration, and, $\omega_4$ a velocity at which said integration is terminated.

[9] An electric motor driver, comprising:
a non-regenerative type power converter, and
velocity controlling means for utilizing a mechanical inertia constant so as to execute velocity control of an electric motor, said electric motor driver being a converting apparatus for converting an alternating current from an alternating power supply into an alternating current of a variable voltage and a variable frequency, said non-regenerative type power converter including a forward converter for converting said alternating current from said alternating power supply into a direct current, a smoothing capacitor connected to a direct current circuit, and a backward converter for converting said direct current into said alternating current,
wherein there is provided inertia-identifying means for calculating said mechanical inertia during only a motor acceleration time-period so that a voltage of said smoothing capacitor will not exceed a predetermined value.

[10] An electric motor driver, comprising:
a non-regenerative type power converter, and
velocity controlling means for utilizing a mechanical inertia constant so as to execute velocity control of an electric motor, said electric motor driver being a converting apparatus for converting an alternating current from an alternating power supply into an alternating current of a variable voltage and a variable frequency, said non-regenerative type power converter including a forward converter for converting said alternating current from said alternating power supply into a direct current, a smoothing capacitor connected to a direct current circuit, and a backward converter for converting said direct current into said alternating current, wherein there are provided accelerating means for executing accelerations at a plurality of times at mutually different velocity-changing rates, and inertia-identifying means for calculating said mechanical inertia from integrated quantities of respective torque proportion signals and velocity-changing widths.

[11] The electric motor driver according to [10], wherein, when executing said accelerations, there is provided means for setting said velocity-changing rates so that said motor current will not become larger than a predetermined value.

[12] The electric motor driver according to [10], wherein, when executing said accelerations, there is provided means for setting $d\omega/dt$ to be smaller than $$3\times(P/2)\times(M/L_2)\times(M\times I^*_d/J)\times(I_{q(limit)}-(\omega/\omega_0)^2\times I_{q0}),$$

where each reference notation denotes the following: $d\omega/dt$ said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $\omega$ motor velocity, $\omega_0$ rated motor velocity, and, $I_{q0}$ rated motor torque current.

[13] The electric motor driver according to [10], wherein, when executing said accelerations, there is provided means for setting a motor velocity at the time when said integrations are terminated so that said motor current will not become larger than a predetermined value.

[14] The electric motor driver according to [10], wherein, when executing said accelerations, there is provided means for setting $\omega_f$ to be smaller than $$\omega_0\times\sqrt{[(I_{q(limit)}-d\omega/dt\times J/(3\times(P/2)\times(M/L_2)\times M\times I^*_d))/I_{q0}]},$$

where each reference notation denotes the following: $d\omega/dt$ said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $\omega_f$ a motor velocity at the time when said integrations are terminated, $\omega_0$ rated motor velocity, and, $I_{q0}$ rated motor torque current.

[15] The electric motor driver according to any one of [10] to [14], wherein, when executing said accelerations, after one acceleration is executed, said velocity is brought back to said velocity before said one acceleration, and thereafter, said velocity-changing rate is modified so as to execute a next acceleration.

[16] The electric motor driver according to any one of [10] to [14], wherein, when executing said accelerations, $\omega_1$ is equal to $\omega_3$ and $\omega_2$ is equal to $\omega_4$, where each reference notation denotes the following: $\omega_1$ a velocity at which said integration of said torque proportion signal is started at one acceleration, $\omega_2$ a velocity at which said integration is terminated, $\omega_3$ a velocity at which said integration of said torque proportion signal is started at a next acceleration, and, $\omega_4$ a velocity at which said integration is terminated.

[17] An inertia calculating method in a driver including a power converter and executing velocity control of an electric motor with the use of a mechanical inertia constant, said power converter including a forward converter for converting an alternating current from an alternating power supply into a direct current, a smoothing capacitor connected to a direct current circuit, and a backward converter for converting said direct current into an alternating current, said power converter converting said alternating current from said alternating power supply into said alternating current of a variable voltage and a variable frequency,
said inertia calculating method, comprising the steps of:
when calculating said mechanical inertia from integrated quantities of torque proportion signals and velocity-changing widths at the time of changing a rotation velocity of said electric motor,
executing said accelerations at a plurality of times at mutually different velocity-changing rates, and
calculating said mechanical inertia from said integrated quantities of said respective torque proportion signals and said velocity-changing widths.

[18] The inertia calculating method according to [17], wherein, when executing said accelerations, said velocity-changing rates are set so that said motor current will not become larger than a predetermined value.

[19] The inertia calculating method according to [17], wherein, when executing said accelerations, $d\omega/dt$ are set to be smaller than $$3\times(P/2)\times(M/L_2)\times(M\times I^*_d/J)\times(I_{q(limit)}-(\omega/\omega_0)^2\times I_{q0}),$$

where each reference notation denotes the following: $d\omega/dt$ said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, ω motor velocity, $ω_0$ rated motor velocity, and, $I_{q0}$ rated motor torque current.

[20] The inertia calculating method according to [17], wherein, when executing said accelerations, a motor velocity at the time when said integrations are terminated is set so that said motor current will not become larger than a predetermined value.

[21] The inertia calculating method according to [17], wherein, when executing said accelerations, $ω_f$ is set to be smaller than $$ω_0 × \sqrt{[(I_{q(limit)} - dω/dt × J/(3×(P/2)×(M/L_2)×M×I_d^*))/I_{q0}]},$$

where each reference notation denotes the following: dω/dt said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $ω_f$ a motor velocity at the time when said integrations are terminated, $ω_0$ rated motor velocity, and, $I_{q0}$ rated motor torque current.

[22] The inertia calculating method according to any one of [17] to [21], comprising the steps of:
when executing said accelerations,
  executing one acceleration, and thereafter, bringing said velocity back to said velocity before said one acceleration, and thereafter,
  modifying said velocity-changing rate so as to execute a next acceleration.

[23] The inertia calculating method according to any one of [17] to [21], wherein, when executing said accelerations, $ω_1$ is equal to $ω_3$ and $ω_2$ is equal to $ω_4$, where each reference notation denotes the following: $ω_1$ a velocity at which said integration of said torque proportion signal is started at one acceleration, $ω_2$ a velocity at which said integration is terminated, $ω_3$ a velocity at which said integration of said torque proportion signal is started at a next acceleration, and, $ω_4$ a velocity at which said integration is terminated.

[24] An electric motor driver, comprising:
  a power converter, and
  velocity controlling means for utilizing a mechanical inertia constant so as to execute velocity control of an electric motor, said power converter including a forward converter for converting an alternating current from an alternating power supply into a direct current, a smoothing capacitor connected to a direct current circuit, and a backward converter for converting said direct current into an alternating current, said power converter converting said alternating current from said alternating power supply into said alternating current of a variable voltage and a variable frequency,
  wherein, when calculating said mechanical inertia from integrated quantities of torque proportion signals and velocity-changing widths at the time of changing a rotation velocity of said electric motor, there are provided accelerating means for executing said accelerations at a plurality of times at mutually different velocity-changing rates, and inertia-calculating means for calculating said mechanical inertia from said integrated quantities of said respective torque proportion signals and said velocity-changing widths.

[25] The electric motor driver according to [24], wherein, when executing said accelerations, there is provided means for setting said velocity-changing rates so that said motor current will not become larger than a predetermined value.

[26] The electric motor driver according to [24], wherein, when executing said accelerations, there is provided means for setting dω/dt to be smaller than $$3×(P/2)×(M/L_2)×(M×I_d^*/J)×(I_{q(limit)} - (ω/ω_0)^2 × I_{q0}),$$

where each reference notation denotes the following: dω/dt said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, ω motor velocity, $ω_0$ rated motor velocity, and, $I_{q0}$ rated motor torque current.

[27] The electric motor driver according to [24], wherein, when executing said accelerations, there is provided means for setting a motor velocity at the time when said integrations are terminated so that said motor current will not become larger than a predetermined value.

[28] The electric motor driver according to [24], wherein, when executing said accelerations, there is provided means for setting $ω_f$ to be smaller than $$ω_0 × \sqrt{[(I_{q(limit)} - dω/dt × J/(3×(P/2)×(M/L_2)×M×I_d^*))/I_{q0}]},$$

where each reference notation denotes the following: dω/dt said velocity-changing rates, P, motor pole number, M, motor mutual inductance, $L_2$ summation of motor secondary-side leakage inductance and M, $I_d^*$ magnetic field excitation current instruction, J said mechanical inertia, $I_{q(limit)}$ predetermined torque current value, $ω_f$ a motor velocity at the time when said integrations are terminated, $ω_0$ rated motor velocity, and, $I_{q0}$ rated motor torque current.

[29] The electric motor driver according to any one of [24] to [28], wherein, when executing said accelerations, after one acceleration is executed, said velocity is brought back to said velocity before said one acceleration, and thereafter, said velocity-changing rate is modified so as to execute a next acceleration.

[30] The electric motor driver according to any one of [24] to [28], wherein, when executing said accelerations, $ω_1$ is equal to $ω_3$ and $ω_2$ is equal to $ω_4$, where each reference notation denotes the following: $ω_1$ a velocity at which said integration of said torque proportion signal is started at one acceleration, $ω_2$ a velocity at which said integration is terminated, $ω_3$ a velocity at which said integration of said torque proportion signal is started at a next acceleration, and, $ω_4$ a velocity at which said integration is terminated.

[31] The inertia calculating method according to any one of [1] to [8], or [17] to [23], wherein said non-regenerative type power converter or said power converter used for feeding said electric motor has an incoming voltage of 3 kV or more and a capacitance of 100 kVA or more, said non-regenerative type power converter or said power converter being also a high-voltage multiple-inverter including a plurality of unit-cell inverters.

[32] The electric motor driver according to any one of [9] to [16], or [24] to [30], wherein said non-regenerative type power converter or said power converter used for feeding said electric motor has an incoming voltage of 3 kV or more and a capacitance of 100 kVA or more, said non-regenerative type power converter or said power converter being also a high-voltage multiple-inverter including a plurality of unit-cell inverters.

What is claimed is:

1. A mechanical inertia calculating method in a driver including a non-regenerative type power converter and executing velocity control of an electric motor with the use of a mechanical inertia constant, said driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, said mechanical inertia calculating method comprising:
executing accelerations at a plurality of times at mutually different velocity-changing rates; and
calculating a mechanical inertia from integrated quantities of respective torque proportion signals and velocity-changing widths,
wherein, when executing said accelerations, a motor velocity at the time when integrations are terminated is set so that motor current will not become larger than a predetermined value.

2. A mechanical inertia calculating method in a driver including a non-regenerative type power converter and executing velocity control of an electric motor with the use of a mechanical inertia constant, said driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, said mechanical inertia calculating method comprising:
calculating mechanical inertia during only a motor acceleration time-period so that a voltage of said smoothing capacitor will not exceed a predetermined value; and
when executing accelerations, executing one acceleration, and thereafter, bringing a velocity back to a velocity before said one acceleration, and thereafter, modifying a velocity-changing rate so as to execute a next acceleration.

3. A mechanical inertia calculating method in a driver including a non-regenerative type power converter and executing velocity control of an electric motor with use of a mechanical inertia constant, said driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, said mechanical inertia calculating method comprising:
executing accelerations at a plurality of times at mutually different velocity-changing rates; and
calculating mechanical inertia from integrated quantities of respective torque proportion signals and velocity-changing widths, and
when executing said accelerations, executing one acceleration, and thereafter, bringing a velocity back to a velocity before said one acceleration, and thereafter, modifying said velocity-changing rate so as to execute a next acceleration.

4. A mechanical inertia calculating method in a driver including a non-regenerative type power converter and executing velocity control of an electric motor with use of a mechanical inertia constant, said driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, said mechanical inertia calculating method comprising:
calculating mechanical inertia during only a motor acceleration time-period so that a voltage of said smoothing capacitor will not exceed a predetermined value,
wherein, when executing accelerations, $\omega_1$ is equal to $\omega_3$ and $\omega_2$ is equal to $\omega_4$, where each reference notation denotes the following: $\omega_1$ a velocity at which integration of a torque proportion signal is started at one acceleration, $\omega_2$ a velocity at which said integration is terminated, $\omega_3$ a velocity at which said integration of said torque proportion signal is started at a next acceleration, and $\omega_4$ a velocity at which said integration is terminated.

5. A mechanical inertia calculating method in a driver including a non-regenerative type power converter and executing velocity control of an electric motor with use of a mechanical inertia constant, said driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, said mechanical inertia calculating method comprising:
executing accelerations at a plurality of times at mutually different velocity-changing rates; and
calculating mechanical inertia from integrated quantities of respective torque proportion signals and velocity-changing widths,
wherein, when executing said accelerations, $\omega_1$ is equal to $\omega_3$ and $\omega_2$ is equal to $\omega_4$, where each reference notation denotes the following: $\omega_1$ a velocity at which integration of a torque proportion signal is started at one acceleration, $\omega_2$ a velocity at which said integration is terminated, $\omega_3$ a velocity at which said integration of said torque proportion signal is started at a next acceleration, and $\omega_4$ a velocity at which said integration is terminated.

6. An electric motor driver, comprising:
a non-regenerative type power converter; and
velocity controlling means for utilizing a mechanical inertia constant so as to execute velocity control of an electric motor, said electric motor driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, wherein there are provided accelerating means for executing accelerations at a plurality of times at mutually different velocity-changing rates, and inertia-identifying means for calculating mechanical inertia from integrated quantities of respective torque proportion signals and velocity-changing widths, and wherein, when executing said accelerations, there is provided means for setting a motor velocity at the time when integrations are terminated so that motor current will not become larger than a predetermined value.

7. An electric motor driver, comprising:

a non-regenerative type power converter, and velocity controlling means for utilizing a mechanical inertia constant so as to execute velocity control of an electric motor, said electric motor driver being a converting apparatus for converting an AC voltage from an alternating power supply into an AC voltage of a variable voltage and a variable frequency, said non-regenerative type power converter including a forward converter for converting said AC voltage from said alternating power supply into a direct current DC voltage, a smoothing capacitor connected to a direct current circuit, and a backward converter for converting said DC voltage into said AC voltage of a variable voltage and a variable frequency, wherein there are provided accelerating means for executing accelerations at a plurality of times at mutually different velocity-changing rates, and inertia-identifying means for calculating mechanical inertia from integrated quantities of respective torque proportion signals and velocity-changing widths, and wherein, when executing said accelerations, after one acceleration is executed, a velocity is brought back to a velocity before said one acceleration, and thereafter, said velocity-changing rate is modified so as to execute a next acceleration.

8. An electric motor driver, comprising:

a non-regenerative type power converter; and velocity controlling means for utilizing a mechanical inertia constant so as to execute velocity control of an electric motor, said electric motor driver being a converting apparatus for converting an AC voltage from an alternating power supply into an AC voltage of a variable voltage and a variable frequency, said non-regenerative type power converter including a forward converter for converting said AC voltage from said alternating power supply into a DC voltage, a smoothing capacitor connected to a direct current circuit, and a backward converter for converting said DC voltage into said AC voltage of a variable voltage and a variable frequency, wherein there are provided accelerating means for executing accelerations at a plurality of times at mutually different velocity-changing rates, and inertia-identifying means for calculating mechanical inertia from integrated quantities of respective torque proportion signals and velocity-changing widths, and wherein, when executing said accelerations, $\omega_1$ is equal to $\omega_3$ and $\omega_2$ is equal to $\omega_4$, where each reference notation denotes the following: $\omega_1$ a velocity at which integration of a torque proportion signal is started at one acceleration, $\omega_2$ a velocity at which said integration is terminated, $\omega_3$ a velocity at which said integration of said torque proportion signal is started at a next acceleration, and $\omega_4$ a velocity at which said integration is terminated.

9. A mechanical inertia calculating method in a driver including a power converter and executing velocity control of an electric motor with the use of a mechanical inertia constant, said power converter including a forward converter for converting an AC voltage from an alternating power supply into a DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, said inertia calculating method comprising:

when calculating a mechanical inertia from integrated quantities of torque proportion signals and velocity-changing widths at the time of changing a rotation velocity of said electric motor, executing accelerations at a plurality of times at mutually different velocity-changing rates; and calculating said mechanical inertia from said integrated quantities of said respective torque proportion signals and said velocity-changing widths, wherein, when executing said accelerations, a motor velocity at the time when integrations are terminated is set so that motor current will not become larger than a predetermined value.

10. A mechanical inertia calculating method in a driver including a power converter and executing velocity control of an electric motor with the use of a mechanical inertia constant, said power converter including a forward converter for converting an AC voltage from an alternating power supply into a direct current DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, said inertia calculating method comprising:

when calculating a mechanical inertia from integrated quantities of torque proportion signals and velocity-changing widths at the time of changing a rotation velocity of said electric motor, executing accelerations at a plurality of times at mutually different velocity-changing rates;

calculating said mechanical inertia from said integrated quantities of said respective torque proportion signals and said velocity-changing widths, and when executing said accelerations, executing one acceleration, and thereafter, bringing a velocity back to a velocity before said one acceleration, and thereafter, modifying said velocity-changing rate so as to execute a next acceleration.

11. A mechanical inertia calculating method in a driver including a power converter and executing velocity control of an electric motor with the use of a mechanical inertia constant, said power converter including a forward converter for converting an AC voltage from an alternating power supply into a DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, said inertia calculating method comprising:
when calculating a mechanical inertia from integrated quantities of torque proportion signals and velocity-changing widths at the time of changing a rotation velocity of said electric motor, executing accelerations at a plurality of times at mutually different velocity-changing rates; and calculating said mechanical inertia from said integrated quantities of said respective torque proportion signals and said velocity-changing widths, wherein, when executing said accelerations, $\omega_1$ is equal to $\omega_3$ and $\omega_2$ is equal to $\omega_4$, where each reference notation denotes the following: $\omega_1$ a velocity at which integration of a torque proportion signal is started at one acceleration, $\omega_2$ a velocity at which said integration is terminated, $\omega_3$ a velocity at which said integration of said torque proportion signal is started at a next acceleration, and, $\omega_4$ a velocity at which said integration is terminated.

12. An electric motor driver, comprising:

a power converter; and velocity controlling means for utilizing a mechanical inertia constant so as to execute velocity control of an electric motor, said power converter including a forward converter for converting an AC voltage from an alternating power supply into a DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, wherein, when calculating a mechanical inertia from integrated quantities of torque proportion signals and velocity-changing widths at the time of changing a rotation velocity of said electric motor, there are provided accelerating means for executing accelerations at a plurality of times at mutually different velocity-changing rates, and inertia-calculating means for calculating said mechanical inertia from said integrated quantities of said respective torque proportion signals and said velocity-changing widths, and wherein, when executing said accelerations, there is provided means for setting a motor velocity at the time when integrations are terminated so that motor current will not become larger than a predetermined value.

13. An electric motor driver, comprising:

a power converter; and velocity controlling means for utilizing a mechanical inertia constant so as to execute velocity control of an electric motor, said power converter including a forward converter for converting an AC voltage from an alternating power supply into a DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, wherein, when calculating a mechanical inertia from integrated quantities of torque proportion signals and velocity-changing widths at the time of changing a rotation velocity of said electric motor, there are provided accelerating means for executing accelerations at a plurality of times at mutually different velocity-changing rates, and inertia-calculating means for calculating said mechanical inertia from said integrated quantities of said respective torque proportion signals and said velocity-changing widths, and wherein, when executing said accelerations, after one acceleration is executed, a velocity is brought back to a velocity before said one acceleration, and thereafter, said velocity-changing rate is modified so as to execute a next acceleration.

14. An electric motor driver, comprising:

a power converter; and velocity controlling means for utilizing a mechanical inertia constant so as to execute velocity control of an electric motor, said power converter including a forward converter for converting an AC voltage from an alternating power supply into a DC voltage, a smoothing capacitor connected to a direct current circuit, and a backward converter for converting said DC voltage into said AC voltage of a variable voltage and a variable frequency, said power converter converting said AC voltage from said alternating power supply into said AC voltage of a variable voltage and a variable frequency, wherein, when calculating a mechanical inertia from integrated quantities of torque proportion signals and velocity-changing widths at the time of changing a rotation velocity of said electric motor, there are provided accelerating means for executing accelerations at a plurality of times at mutually different velocity-changing rates, and inertia-calculating means for calculating said mechanical inertia from said integrated quantities of said respective torque proportion signals and said velocity-changing widths, and wherein, when executing said accelerations, $\omega_1$ is equal to $\omega_3$ and $\omega_2$ is equal to $\omega_4$, where each reference notation denotes the following: $\omega_1$ a velocity at which an integration of said torque proportion signal is started at one acceleration, $\omega_2$ a velocity at which said integration is terminated, $\omega_3$ a velocity at which said integration of said torque proportion signal is started at a next acceleration, and $\omega_4$ a velocity at which said integration is terminated.

* * * * *